Dec. 1, 1964     O. W. STROHM     3,159,407
FLUID LUBRICANT SEAL FOR WHEEL HUBS
Filed June 29, 1961
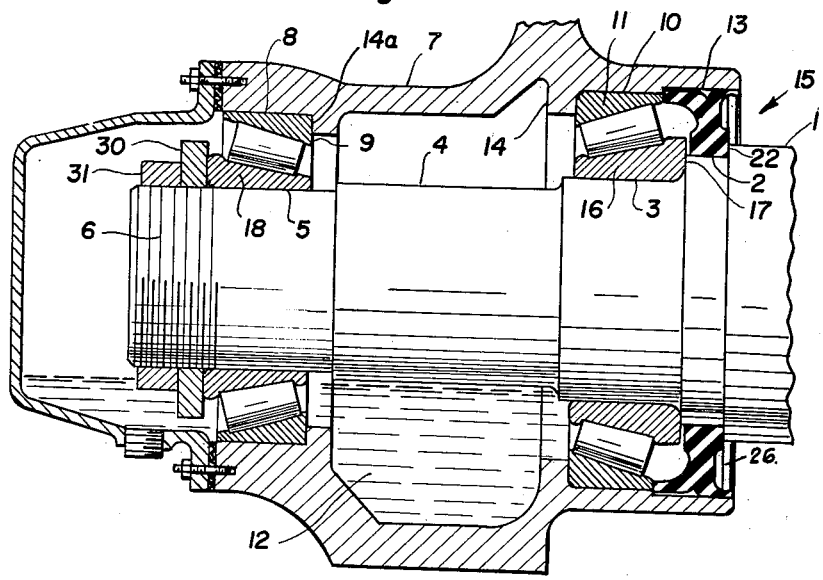
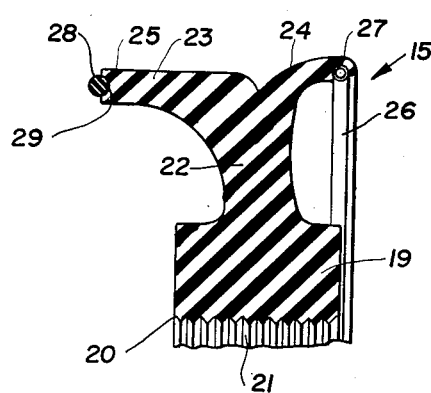
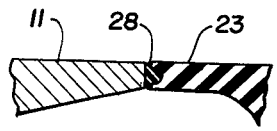
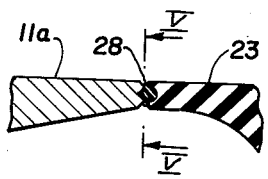
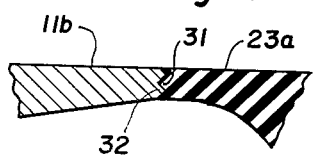
INVENTOR.
OSCAR W. STROHM
BY
*Christy, Parmelee & Strickland*
his ATTORNEYS

United States Patent Office 3,159,407
Patented Dec. 1, 1964

3,159,407
FLUID LUBRICANT SEAL FOR WHEEL HUBS
Oscar William Strohm, 706 Linwood Drive, Pittsburgh, Pa., assignor of one-half to Arthur Deyo, Glenshaw, Pa.
Filed June 29, 1961, Ser. No. 120,653
6 Claims. (Cl. 277—82)

The present invention relates to lubricant seals for wheel hubs and, more specifically, to a fluid lubricant seal for a wheel hub rotating relative to the seal.

Freely rotating wheels of automotive vehicles have found to be more effectively lubricated with a fluid as opposed to a grease type lubricant. A suitable oil lubricant, if properly sealed in the wheel hub to exclude water and dirt, is longer lasting and more effective than grease. Such lubrication is now used extensively on automotive truck and trailer units.

Presently available seals, when found to be initially effective, soon fail to retain the lubricant under operating conditions. These failures have been observed to be the result of both design of seal and the excessive difficulties in properly mounting the seals within the wheel hubs. Existing hub machining practices have also largely contributed to some portion of such failures.

Wheel hubs for such large capacity vehicles necessitate the use of a pair of spaced anti-friction bearings in each wheel. Since the seal is most advantageously placed in the inner face of the wheel hub, the seal must be either mounted upon the wheel hub before assembling the wheel and bearings thereon or applied after the wheel and bearings are assembled upon the axle.

The first mode of assembly obscures the mechanics view of the seal making it difficult, if not impossible, to properly engage the inner wheel bearing race with the seal. The second mode of assembly wherein the seal is applied after mounting the wheel on the axle prevents ready access by the mechanic to the inner face of the wheel hub and renders most difficult the effective mounting of the seal so as to both retain the fluid lubricant within the hub and prevent entrance of the dirt and water to the bearings.

One object of the invention is to provide a seal which may be applied to the axle before mounting of the wheel and which insures adequate sealing engagement between seal and bearings to retain fluid lubricant and exclude unwanted water and dirt.

Another object of the invention is to provide a seal which cooperates with the wheel bearings to improve the degree of sealing therewith after the adjacent face of the wheel bearing race has rotated relative to the body of the seal.

A further object of the invention is to provide controlled resilience in an otherwise semi-rigid seal to facilitate mounting and adjusting the wheel bearing relative to the seal.

These and other objects of the invention will be made apparent from the following specification and the drawing forming a part thereof, wherein:

FIG. 1 shows a cross-section through the wheel hub, bearings, seal and axle receiving same;

FIG. 2 shows an enlarged vertical cross-section through a portion of the seal;

FIG. 3 shows an enlarged cross-section through the outer race of the wheel bearing and adjacent portion of the seal showing flattening of a portion of the seal as the wheel bearings are adjusted;

FIG. 4 shows a modified form of wheel bearing outer race to improve the sealing action;

FIG. 5 shows a section on lines V—V of FIG. 4; and

FIG. 6 shows a further modification wherein the end of seal portion 23a and end of bearing cup 11b are provided with inter-engaging serrations.

Referring now to FIG. 1, the vehicle axle has an enlarged mid-portion 1 and extending therefrom in opposite directions are the reduced collar portions 2, inner bearing cone seats 3, bearing spacing portions 4, outer bearing cone seats 5 and threaded end portions 6. The wheel 7 has a hollow annular enlongated open ended hub portion having adjacent opposite ends, the machined annular surface 8 receiving the front bearing cup 9, the machined annular surface 10 receiving the rear bearing cup 11 and an enlarged annular portion 12 forming an oil reservoir. It will be noted that the hub has an annular portion 13 extending rearwardly of the machined surface 10 and which overlies the axle collar portion 2. Customarily, the annular surface 13 is rough machined to a larger diameter than the adjacent ground annular surface 10. Inwardly of surface 10 is an inwardly extending shoulder 14. The inner bearing cup 11 is pressed into the hub upon annular surface 10 and into abutting engagement with shoulder 14.

Mounted upon each axle collar 2 is a sealing ring indicated generally as 15. Outwardly of ring 15 and having a sliding fit upon seat 3 is the inner bearing cone 16 disposed in abutting relation to axle shoulder 17. An outer bearing cone 18 is slidably mounted upon axle seat 5 and the outer bearing cup 9 is press fitted into annular wheel hub portion 8 in abutting relation to shoulder 14a.

The sealing ring 15 is an integral annular member having an enlarged central hub portion 19 provided with an annular central opening 20 having on the inner periphery thereof annular serrations 21 providing a snug oil sealing fit upon axle collar 2 and in abutting engagement with axle shoulder 22.

Referring now to FIG. 2 of the drawings, a segment of the seal 15 as shown enlarged to illustrate the construction thereof. This seal 15 may be of semi-rigid rubber, plastic or other suitable materials. The central hub portion opening 20 is of suitable diameter to have a hand pressed fit upon the ground axle collar 2, the serrations 21 yielding enough to provide a snug fit against axle shoulder 22. Extending above hub portion 19 is a rib 22 having a substantially rigid portion 23 and a semi-flexible thinner portion 24. The outer end of the portion 24 extends above the upper surface 25 of portion 23 and engages wheel hub surface 13 and is resiliently pressed against surface 13 by an annular spring 26 recessed into 24 at 27. Seal portion 23 has mounted in its outer face an O-ring 28 of relatively compressible material secured in recess 29. The ring 28 extending outwardly of 23 for a purpose to be hereinafter discussed.

Referring again to FIG. 1 of the drawing, the seal, bearings and wheel are mounted upon the axle in the following manner. Seal 15 is first hand pressed over axle collar 2 into abutting engagement with shoulder 22 forming an oil, water and dirt seal with collar 2. Thereafter bearing cone 16 is applied upon axle collar 3 with a sliding fit into abutment with axle shoulder 17. The cone 16 having the tapered bearing rollers mounted therein in the usual manner. The wheel hub 7, having previously had the cups 9 and 11 pressed therein, is moved over the outer end of the axle until the cup 11 engages the bearing rollers in cone 16. Thereafter bearing cup 18 and assembled rollers are mounted upon surface 5 of the axle to support the wheel hub 7. The usual washer 30 and adjusting nut 31 are mounted upon axle threaded portion 6 and the nut 31 rotated pushing the cone 18 and wheel hub 7 inwardly until the wheel bearings are properly adjusted. The movement of wheel hub 7 inwardly of the axle engages the inner face of bearing cup 11 with the adjacent O-ring 28 upon the portion 23 of the seal 15, slightly compressing the O-ring to form a tight oil seal. The seal 15 due to its engagement with axle shoulder 22 resists inward movement so as to effect compression of ring 28. The seal portion 24 being distended by spring 26 presses against wheel hub portion 13 to form a water and dust seal. The seal 15 remains in fixed relation upon the axle while the bearing cup 11 rotates with the wheel relative to the ring 28 in the seal. The wheel hub portion 13 rotates relative to seal portion 24 and spring 26 compensates for any wear upon the seal portion 24.

Referring now to FIGS. 4 and 5 of the drawing, the bearing cup 11a has its inner peripheral edge adjacent O-ring provided with annular grooves 32 so that as cup 11a is pressed against and compresses ring 28, the ring seats within such grooves 32 increasing the sealing engagement between ring and cup. Obviously, when desired, the cup 11a may be provided with a larger single arcuate groove within which the ring 28 may seat to provide the extra sealing effort.

Referring now to FIG. 6 of the drawing, the abutting ends of bearing cup 11 and seal portion 23a may be provided with inter-engaging serrations 31, 32 to form a further effective seal.

The seal 15 may be formed of a suitable rubber, plastic or other materials. Preferably the seal material should be semi-flexible, where by the thicker seal portion 23 has suitable rigidity to back up ring 28 when compressed by engagement with the adjacent bearing cup and the thinner seal portion 24 will have sufficient flexibility to be spread outwardly by spring 26 into adequate sealing engagement with the adjacent wheel hub. As previously stated, the O.D. of seal portion 24, at least in the area adjacent spring 26, is preferably greater than the O.D. of seal portion 23, so that only the tip portion of seal portion 23 need engage hub surface 13.

I claim:

1. A seal for retaining fluid bearing lubricant within a wheel hub rotating relative to an axle, comprising a seal hub portion enclosing a collar of the axle, a seal web portion integral with said hub portion and extending radially therefrom towards the wheel hub, an annular extension on said web portion extending inwardly therefrom within the wheel hub in spaced relation thereto, means on the inner end of said annular extension engaging the adjacent cup of a wheel bearing, a second and oppositely extending annular extension on said web portion disposed within the wheel hub and means on said latter annular extension resiliently pressing a portion thereof into engagement with the overlying wheel hub.

2. The seal as defined in claim 1 wherein said means on the first-named annular extension comprises a seal portion of greater resilience than that of the annular extension.

3. The seal as defined in claim 1 wherein said means on the first-named annular extension comprises an O-ring of greater resilience than that of the said annular extension.

4. The seal as defined in claim 2 wherein the means on the second annular extension of said seal web portion comprises an annular compression spring.

5. The seal as defined in claim 1, wherein the adjacent faces of said wheel bearing cup and first-named annular extension have complimentary inter-engaging portions.

6. The seal as defined in claim 5, wherein the complimentary wheel bearing cup engaging portion of the said annular extension has a greater resilience than the said annular portion.

References Cited in the file of this patent

UNITED STATES PATENTS

| | | |
|---|---|---|
| 2,896,979 | Stephens | July 28, 1959 |
| 2,943,872 | Cahill et al. | July 5, 1960 |
| 2,959,433 | Hill | Nov. 8, 1960 |
| 2,990,201 | Stephens | June 27, 1961 |
| 2,999,702 | Dunn et al. | Sept. 12, 1961 |
| 3,022,081 | Kosatka | Feb. 20, 1962 |
| 3,070,378 | Bojako et al. | Dec. 25, 1962 |

FOREIGN PATENTS

| | | |
|---|---|---|
| 737,787 | Great Britain | Oct. 5, 1955 |